United States Patent [19]
McEligot

[11] Patent Number: 5,734,347
[45] Date of Patent: Mar. 31, 1998

[54] DIGITAL HOLOGRAPHIC RADAR

[76] Inventor: E. Lee McEligot, 309 Vista Trucha, Newport Beach, Calif. 92660

[21] Appl. No.: 661,140

[22] Filed: Jun. 10, 1996

[51] Int. Cl.$^6$ ............................................. G01S 13/89
[52] U.S. Cl. ........................... 342/159; 342/196; 342/146
[58] Field of Search ................................. 342/159, 196, 342/146, 158

[56] References Cited

U.S. PATENT DOCUMENTS

| | | | |
|---|---|---|---|
| 3,400,363 | 9/1968 | Silverman | 342/157 |
| 3,842,251 | 10/1974 | Powers, Jr. et al. | 235/181 |
| 4,602,257 | 7/1986 | Grisham | 342/25 |
| 4,924,235 | 5/1990 | Fujisaka et al. | 342/374 |
| 5,087,917 | 2/1992 | Fujisaka et al. | 342/84 |
| 5,191,344 | 3/1993 | Moreira | 342/25 |
| 5,341,141 | 8/1994 | Frazier et al. | 342/59 |
| 5,563,601 | 10/1996 | Cataldo | 342/25 |

*Primary Examiner*—J. Woodrow Eldred
*Attorney, Agent, or Firm*—Leo R. Carroll

[57] ABSTRACT

This invention generates a radar analog of the optical hologram by recording a radar image in the range/doppler plane, the range/azimuth plane, and/or the range/elevation plane according to the type and application of the radar. The invention embodies a means of modifying the range doppler data matrix by scaling, weighing, filtering, rotating, tilting, or otherwise modifying the matrix to produce some desired result. Specific examples are, removal of known components of clutter in the doppler frequency spectrum by filtering, and rotating/tilting the reconstructed image to provide a view not otherwise available. In the first instance, a reconstructed image formed after filtering the Fourier spectrum would then show a clutter free replication of the original range/PRI object space. The noise 'floor' can also be modified such that only signals in the object space that produce a return signal above the 'floor' will be displayed in the reconstructed image.

19 Claims, 6 Drawing Sheets

$-(\overline{\log(x3)})$

FIG. 6

$-(\overline{\log(x3)})$

DIGITAL HOLOGRAPHIC RADAR

BACKGROUND OF THE INVENTION

1. Field of the Invention

This invention follows U.S. Provisional Patent Application, Ser. No. 60/000,120, filed on Jun. 9, 1995. The invention relates generally to radar systems and particularly to improvement in the processing and display of radar images reflected from targets and scenes illuminated by the radar's transmitter and antenna system. The proposed invention concerns the improvement in a radar system's ability to detect, distinguish and use target signals embedded in a background of clutter. The prime object is to provide real-time, or near real-time 3 dimensional radar images heretofore not available, by employing concepts analogous to those used in optical holography.

When operating in a look-down environment and/or in a background of land or sea clutter, performance improvements will be obtained in both continuous wave (CW) and pulse radar (PR) radar systems. Particular applicability will be found in: high, medium, and low pulse repetition frequency (PRF) pulse doppler radars, and for radars used for target search and acquisition.

2. Description of Related Art

The theory regarding holographic image forming and reproduction has been well developed and documented in the literature. The original work was done in the optical field and was first reported by D. Gabor in, "A New Microscope Principle", Nature, vol. 161, May 1948, pp. 777–778. See also: D. Gabor and W. P. Goss, "Interference Microscope with Total Wavefront Reconstruction," *J. Opt. Soc. Am.*, vol. 56, Jul. 1966, pp. 849–858. Gabor's original works were extended into the radar field by Cutrona, Leith and others, see for example; L. J. Cutrona, E. M. Leith, L. J. Porcells, and W. E. Vivian, "On The Application of Coherent Optical Processing Techniques to Synthetic Aperture Radar," *Proc. IEEE*, vol. 54, Aug. 1966, pp. 1026–1032.

Silverman, in U.S. Pat. No. 3,400,363, disclosed a holographic "Wavelet Reconstruction Process for Sonic, Seismic and Radar Exploration." In this surface mapping application, a pair of spaced apart detector arrays each receive energy from an object and from a modulation of reference beam. The interference pattern between direct and reflected waves produces a corresponding distribution of luminous energy, which, after photographing, may be viewed by looking at the record in a beam of coherent light.

Powers Jr. et al, presents a "Radar Data Map Correlator" in U.S. Pat. No. 3,842,251, in which synthetic aperture radar return signals are processed by means of a coherent optical system which develops holographic images of the signals which heretofor were only recorded on film for subsequent analysis. The improved device and technique of this invention enables the real time display of a radar data map without interfering with the recording of this information.

In U.S. Pat. No. 3,685,051, Wells described a non-photographic firm "Holographic Imaging System Using Crossed Linear Arrays of Energy Sources and Sensors." In this non-photographic film approach, a reduction in the total number of sources and receivers is achieved by use of a single linear array of receivers in combination with either a single energy source which is mechanically scanned in one dimension, or a linear array of sources oriented transversely to the array of receivers.

In the "Holographic Radar" disclosed by Fujisanka et al. in U.S. Pat. No. 4,924,235, the large numbers of receivers required in a phased array are reduced by time sharing a receiver with multiple antenna elements. Memory elements for storing the data output by the receivers, and switching elements for switching the connections between the antenna elements and the receivers, and between the receivers and the memory elements, are provided. Other U.S. patents considered include:

U.S. Pat. No. 5,315,095 Beam with extended confinement for scanning purposes
U.S. Pat. No. 5,341,141 3-D imaging radar
U.S. Pat. No. 5,311,187 Search radar system
U.S. Pat. No. 5,283,672 Holographic techniques for generating high resolution telescopic
U.S. Pat. No. 5,191,344 Method for digital generation of Synthetic Aperture Radar images and apparatus for carrying out said method.

The fundamental problem addressed by holography is that of wavefront recording and reconstruction, which involves recording and later reconstructing, the amplitude and phase distributions of a monochromatic wave disturbance incident on a prescribed surface such as an optical recording medium or a radar antenna. The difficulties associated with this task in the optical spectrum result from the requirement to measure phase, and the fact that optical detector response is proportional to the light intensity, i.e., squared amplitude, of the light wave, and is independent of phase. It is therefore necessary to use an interferometric process to encode the phase distribution of the incident wave as a measurable spatial or temporal modulation of the intensity distribution. The wave of interest is thus allowed to interfere with a coherent "reference wave", so that interference patterns are formed and recorded.

Holograms are sometimes constructed using diffused laser light in the recording process. The effect of the diffuser is to introduce an extremely complex phase distribution across the illuminating wave, or equivalently to randomize the phase of the light transmitted by each point on the object. As a consequence the elementary signals add at the recording plane with unrelated, or random phases. Another situation in which diffused illumination arises quite naturally is in the recording of holograms of three dimensional objects. Most three dimensional scenes containing figurines or models or other more naturally occurring objects are composed of surfaces that are rough on the scale of an optical wavelength. Thus the object itself serves to diffuse the reflected light, and the holograms recorded from such scenes strongly resemble those recorded from diffusely illuminated transparencies. The extension to radar holography becomes clear when considering tracking targets in a high clutter background. Firstly, most radar targets are rough with respect to typical radar microwave wave lengths, thus giving rise to the natural diffusion of the reflected signals; and secondly spread spectrum radar transmitters are the direct radar analogue of the diffused optical illuminator.

SUMMARY OF THE INVENTION

This invention generates a radar analog of the optical hologram by recording a radar image in the range/doppler plane, the range/azimuth plane, and/or the range/elevation plane according to the type and application of the radar. The range/doppler embodiment is described below to explain the operational features of my invention.

In the range/doppler radar system the task is to measure the range, radial velocity, and relative reflectivity of a target which is generally a complex distribution of scatterers. Let a radar wave be represented as $$f(t) = a(t) \exp j[\omega_0 t + \phi(t)]$$
$$= u(t) \exp j(\omega_0 t)$$

where $u(t)=a(t) \exp j[\phi(t)]$ is the complex modulating function. In the above, $f_O=\omega_O/2\pi$ is the radio frequency (RF) carrier frequency, and $a(t)$ and $\phi(t)$ are the amplitude and phase modulations respectively, that are imposed on the radar wave. When this wave is reflected from a joint object at range R, the signal returned to the radar will be of the form:

$$g(t)=a'(t)\exp j[2\pi(f_O-f_d)t-\tau)]$$

where $a'(t)$ is the amplitude of the returned signal, and $f_d$ and $\tau$ represent a doppler shift and range delay respectively.

The range/doppler measurement is made by cross correlating the radar return signal with a usually coherent signal which is a replica of the transmitted signal. A frequency shift may be added for processing convenience. Thus, $r(t)=f(t)\exp(-j\omega_1 t)$.

The cross correlation is described as: $x(\tau_1, \omega_1) = r*g$, and may be written as:

$$x(\tau,f_d) = -\infty \int^{\infty} u(t)u^*(t+\tau) \exp -j2\pi f_d \, dt.$$

This is recognized as the ambiguity function of $f(t)$. Note that when there is no doppler shift, the ambiguity function becomes just the magnitude squared of the autocorrelation function.

The similarity to holography results as follows: simultaneously within the radar wave detected at the receiver are many superimposed target and clutter signals, originating from a range velocity (range/doppler) object space, and the requirement is to unscramble those signals and reconstruct the original object space.

The ambiguity function describes how the system images the object field into a two-dimensional range/doppler space. The ideal waveform modulating function $u(t)$ is designed to give an ambiguity function with a sharp central peak at the origin with zero responses elsewhere. Many modulation functions have been determined that yield good ambiguity functions, that is, they have good responses at the origin and low secondary responses. Among the most popular are the pseudo random codes used to amplitude and/or frequency and/or phase modulate the transmitter signal. These codes can be designed to have both long duration, providing very sharp frequency resolution; and high bandwidth, providing very sharp range resolution. This invention does not depend upon the use of such a code; however, use of such a code will enhance the resolution of the reconstructed images.

Another unique feature of this invention is the use of two dimensional (2-D) and three dimensional (3-D) digital graphical techniques to display the reconstructed images. Specifically the use of 3-D graphics results in a 3-D image as sometimes obtained in optical holography when the object roughness is large compared to the optical wavelength. This condition is usually met in the radar realm. The use of a color cathode ray tube (CRT) display further enhances the appeal of the reconstructed images.

This invention involves a means to sample and record the radar return signals as a function of range for each pulse repetition interval (PRI) for a pulse radar. (A high speed sampler may be used to obtain the desired data rate for long PRI radars.) The radar return signals are correlated with a delayed replica of the transmitted signal, sampled, then processed through an analog-to-digital (A/D) converter and stored in a data matrix. This generates the digital equivalent of an optical hologram, (a 'digigram') that is formed as a matrix of point object returns where each cell of the matrix contains the measured return signal energy at a single range sample versus PRI. When the measured data is I and Q data, (as for a radar processing both in-phase and quadrature signal components), then both amplitude and phase information is stored as a 'digigram'. The analogy to an optical hologram is evident.

This invention does not depend on I and Q processing, but takes advantage of such data when available. For the case of a radar that does not process I and Q signal components, a 3-D image may be reconstructed from the amplitude only data. This is similar to the case where 3-D images are reconstructed from optical holograms that were formed with diffused illumination as discussed above. In the radar case, the image reproduction takes advantage of the natural diffusion of target objects that are large on a scale of the radar wavelength, or purposeful diffusion of the transmitter signal. The amplitude-only data stored in the digigram in this case will be the complex sum of elementary scatterers in the object cell.

Reproduction of the image takes advantage of the inherent short term stability of most radar transmitters. Thus range samples taken within one PRI interval are coherent with respect to each other. When these samples are displayed in a 3-D digital surface display, the lines that connect each range sample reflect (except for a possible scaling factor) the actual phase angle between samples. When the short term stability maintains over the interval represented by the number of PRIs recorded, then the 3-D display lines drawn between range samples vs PRI, will also exhibit coherence. Thus a very useful 3-D representation of the original object space can be reproduced.

In the preferred embodiment, this matrix is arranged with samples at constant range appearing in columns of the matrix, and samples at constant PRI appearing in rows of the matrix. (Of course the rows and columns could be interchanged making it a PRI/range object space.)

The range/PRI matrix is transformed into a range/doppler object space by taking the column by column Fourier transform of the matrix, in effect, a set of vector Fourier transforms for each range column. A 2-D Fourier transform can be performed instead of the column by column transform, at the expense of some added complexity in subsequent filtering. It is evident at this point that talking the inverse Fourier transform (column by column) or inverse 2-D transform of the range doppler matrix will return the original range/PRI matrix (object space), and nothing would have been gained from this transform/inverse-transform process. The utility of this invention obtains from the ease in which the range/doppler matrix may be modified prior to the inverse transform process, thus allowing a suitably modified image to be reconstructed.

This invention embodies a means to modify the range doppler data matrix by scaling, weighing, filtering, rotating, tilting, or otherwise modifying the matrix to produce some desired result. Specific examples are, removal of known components of clutter in the doppler frequency spectrum by filtering, and rotating/tilting the reconstructed image to provide a view not otherwise available. In the first instance, a reconstructed image formed after filtering the Fourier spectrum would then show a clutter free replication of the original range/PRI object space. The noise 'floor' can also be modified such that only signals in the object space that produce a return signal above the 'floor' will be displayed in the reconstructed image.

A second embodiment of this invention involves generation of a range/azimuth data matrix, as may be obtained by sampling and recording the radar return signal of an azimuth scanning radar as a function of range for each PRI, as the radar scans across a scene of interest. For each PRI the range samples are started at an identical delay (range). Thus the data matrix represents some wedge in the range/azimuth object space. PRI and azimuth are used synonymously here because the scanning radar will point in a slightly different azimuth direction, determined by the azimuth scanning rate, for each successive PRI. This data matrix is processed as described above for the range/doppler embodiment. A Fourier transform is performed on the input data matrix. The resulting matrix is modified, as per example by filtering, and the inverse transformation is performed resulting in a reconstruction of a suitably modified image of the object wedge. The image may then be rotated and/or tilted to provide any viewpoint desired.

Many modulation functions have been determined that yield good ambiguity functions, that is, they have good responses at the origin and low secondary responses. Among the most popular are the pseudo random codes used to amplitude and/or frequency and/or phase modulate the transmitter signal. These codes can be designed to have both long duration, providing very sharp frequency resolution; and high bandwidth, providing very sharp range resolution.

DESCRIPTION OF PREFERRED EMBODIMENTS

Figure 1A:
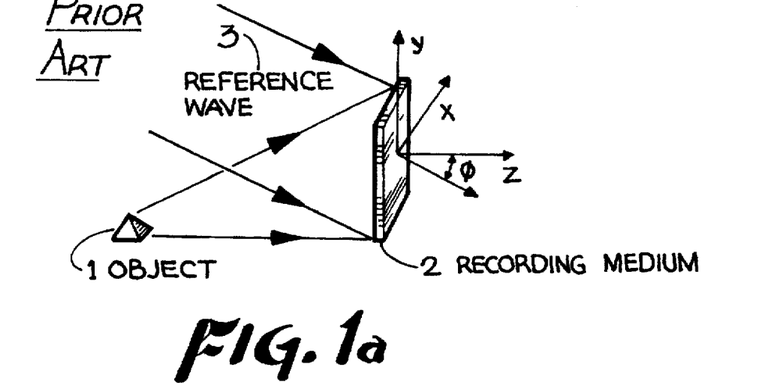
FIG. 1a shows the recording of an optical hologram.
Figure 1B:
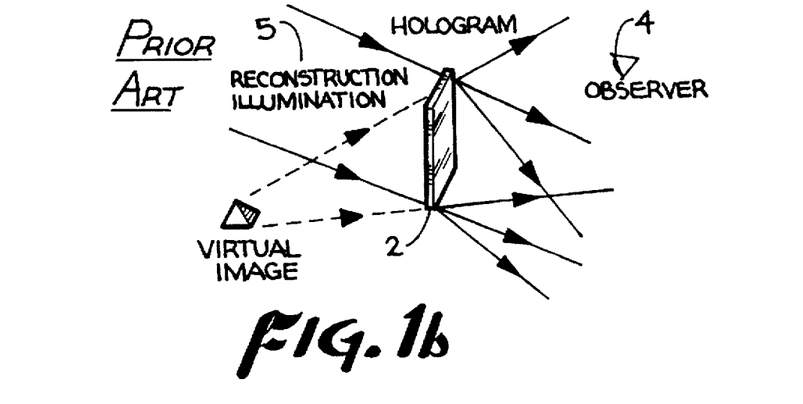
FIG. 1b shows the reconstruction of an object image.

FIG. 1a below shows a diagram of the hologram recording process. The image from an object 1 is superimposed on a recording medium 2 with a reference or modulating wave 3 from an illuminating source. (not shown) The hologram itself is seldom the end product. Usually the recording of the image as a hologram is the first step in a multi-step process, the subsequent steps consisting of reconstructing a new wave from the recorded data. The amplitude and phase of the new wave are generally desired to be identical to the amplitude and phase of the original wavefront, except for a possible scaling of the spatial coordinates. FIG. 1b below shows the object reconstruction process. The observer 4 will see a reconstructed image of object 1 when the hologram is illuminated. The ability to record information about an object in the form of a hologram, instead of a directly recorded image, provides a variety of advantages with respect to the type and quality of information that can then be recovered. For example, the reconstructed image recovered when the hologram is illuminated may be three dimensional.

Figure 2:
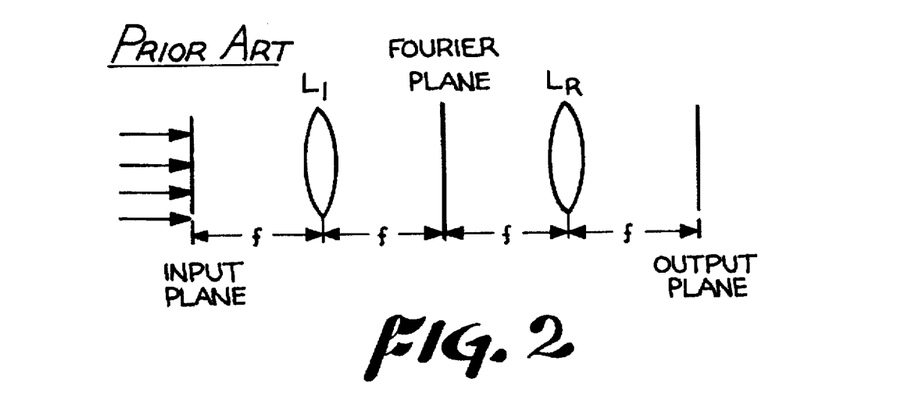
FIG. 2 shows a simple coherent optical data processing system.

Coherent optical data processing systems often depend on the ability of simple positive (converging) lenses to perform a two dimensional Fourier transformation of a coherent field distribution impressed across its front focal plane. Specifically, of a complex amplitude distribution is impressed across the front focal plane of a positive lens of focal length f, then across the rear focal plane will appear a field distribution that is the two dimensional Fourier transform of the front focal plane distribution. If two such lenses are separated by a distance $2f$, as shown in FIG. 2, then the lens L1 displays the Fourier spectrum of the input image in the Fourier plane where the spectral components can be modified in amplitude and or phase, and the lens L2 performs a second transformation to yield a linearly filtered image of the original input image.

It is indeed this ability to suitably modify (optically filter) the reconstructed image that has given rise to the wide application of holography in such fields as electron microscopy, image deblurring, synthetic aperture radar, etc. This property is readily extended in the field of radar signal processing, and current high speed digital computers offer the ability to record, modify in some manner (e.g. filter) and reconstruct and display a modified replica of the original image.

Figure 3:
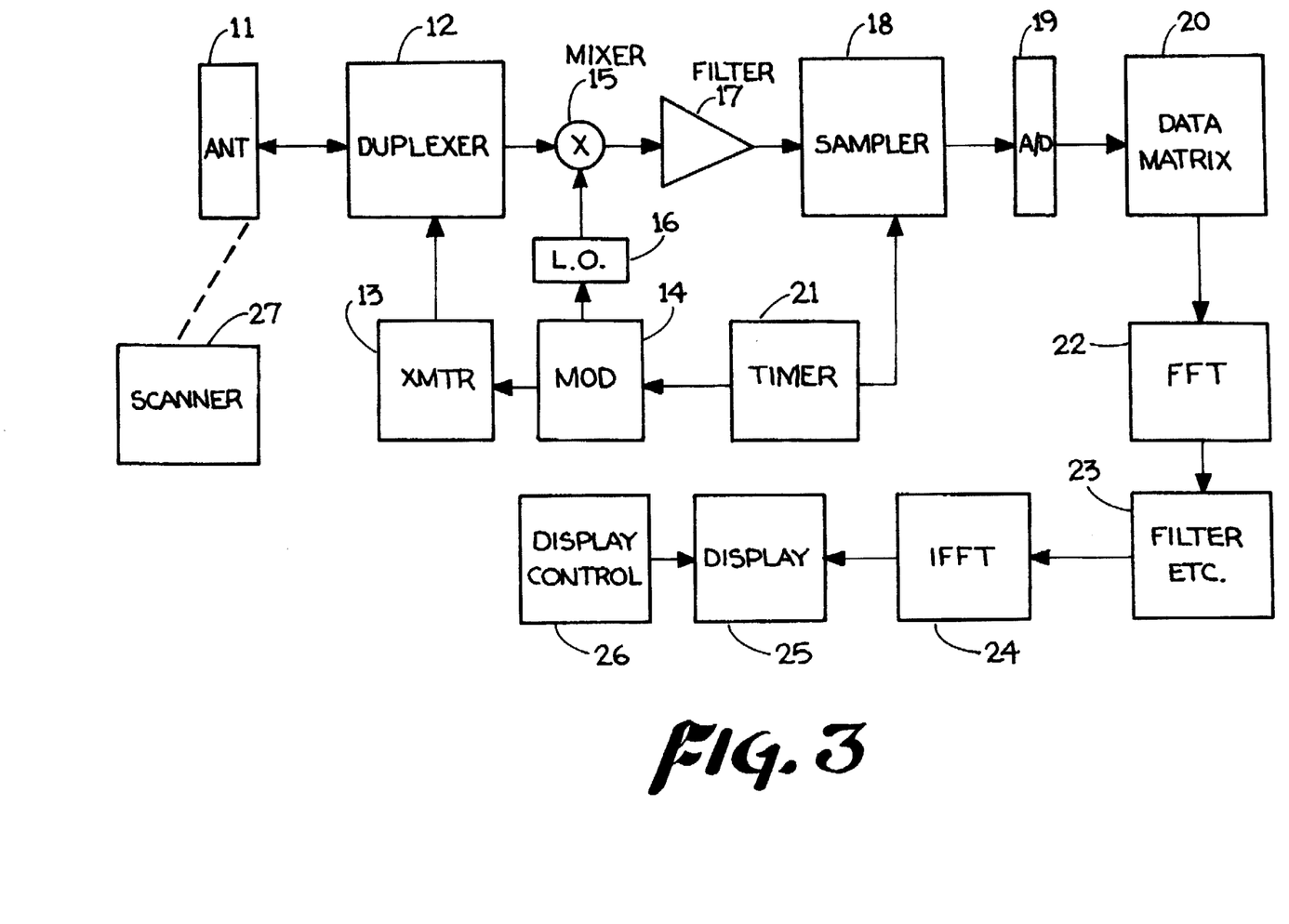
FIG. 3 is a block diagram showing the principle functional elements comprising the Digital Holographic Radar.

FIG. 3 below is a block diagram of a radar configured in accordance with this invention. The block diagram is general enough to allow description of the principle embodiments, as well as other embodiments of significant importance. The holographic nature of the processes of image recording, Fourier transformation, modification, and image reconstruction are quite independent of specific applications. For example, the same general process can be used to generate a digitally stored radar analogue of the optical hologram ('digigram') for a range/azimuth object space, as is used to generate the digigram of a range/doppler object space. Subsequent processing and image reconstruction steps are likewise similar for both of the above cases. The principle embodiments are described with the aid of the block diagram (FIG. 3) in the paragraphs below.

Referring to FIG. 3, the modulator 14 is used to apply a complex modulation function on the transmitter 13. This modulation can range from simple pulse modulation, to the more complex spread spectrum modulations used in certain modern radar applications. The action of the modulator is controlled by the timer 21, which synchronizes all radar timing functions, such as PRI, pulse width, subpulse width in the case of a coded modulation, and antenna scan timing.

The signal from transmitter 13 is passed to the antenna 11 via the duplexer 12. Antenna 11 radiates the signal into space and collects the return signal when reflected from a target. Antenna scanner 17 is only used for scanning radars.

The target reflected signal is passed to the first mixer 15 via the duplexer 12, where the signal is mixed with the signal from local oscillator 16, which carries a delayed replica of the modulation imposed upon transmitter 13. (delay not shown) The mixer 15 and filter 17, perform the cross correlation between the received signal and the delayed replica of the signal from transmitter signal.

The output of the filter 17 is passed to the sampler 18, which samples the signal under control of the timer 21. The output of sampler 18 is passed to an A/D converter 19 which is also clocked by the timer 21. The output of the A/D converter 19 is stored in a data matrix 20. This data file is the digital equivalent of the optical hologram as described above. The file is thus referred to as a 'digigram'.

The digigram is subsequently outputed to a fast Fourier transform (FFT) 22, when the required data matrix has been filled. The size of the data matrix file is determined by the desired range and doppler resolution and the time required to perform subsequent processing, so that results may be displayed in real, or near real time.

The output of FFT 22 is passed to a signal processing module 23, that performs such operations as filtering, weighing, and scaling of the Fourier transformed signal. Thus the Fourier transform matrix is modified in some desired way and then passed to an inverse FFT, or IFFT 24, where the inverse transformation on the modified matrix is performed.

The output of the IFFT 24 is passed to the 3-D digital display 25, where a suitably modified replica of the original object space is reconstructed and displayed. The display is controlled by the display control unit 26, where image features such as rotation, tilt, and zoom may be changed.

It is evident that the embodiment described above is applicable to a variety of radar systems, with particular applicability to record modify and reconstruct images in range doppler space, as well as range azimuth space.

FIGS. 4 through 8 show the results of application to this process to an actual radar range/azimuth angle object space, the image of which was recorded in a range/azimuth angle digigram.

Figure 4:
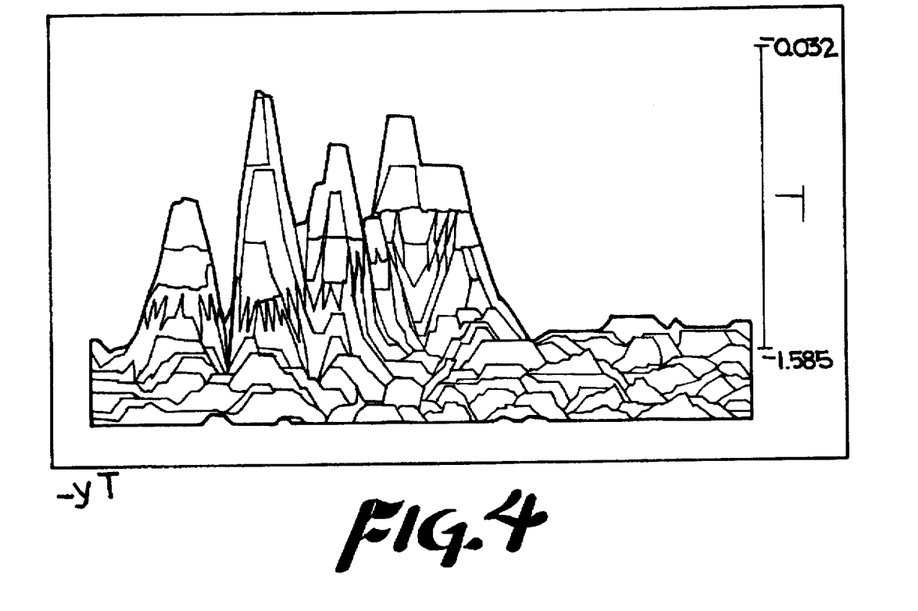
FIG. 4 shows the image reconstructed from the matrix of the recorded data samples, in a 3-D surface plot as viewed from a point slightly above and to the side of the radar to show the complete matrix of data samples.

FIG. 4 shows the object image reconstructed directly from the digigram.

Figure 5:
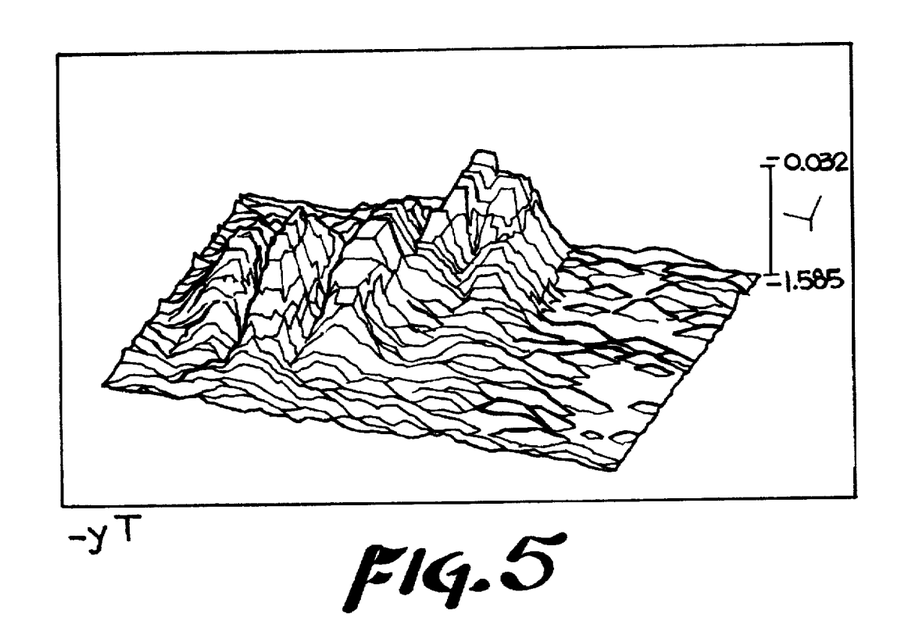
FIG. 5 shows the same matrix of input data rotated and tilted in a manner to move the radar off to the right of the scene and to show the three dimensional character of the object scene.

FIG. 5 shows rotation and tilting of the image providing a 3-D view of the original object space. The origin in this FIG. 0, 0 coordinates) is at the lower right hand corner, with range increasing toward the left and azimuth increasing toward the up-right direction. The radar is thus off to the right of this scene. The range of greys or colors in this example, display the relative signal strength of the elementary point returns in the target object space.

Figure 6:
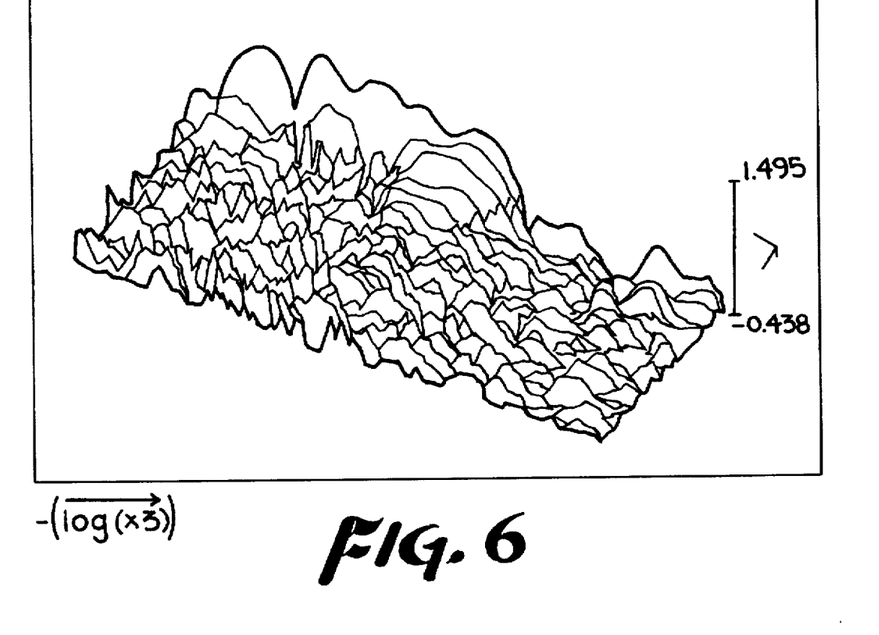
FIG. 6 presents a column by column Fourier transform of the matrix of input data shown in FIGS. 4 and 5 above, using a logarithmic scale.

FIG. 6 shows the digital equivalent to the optical Fourier plane, (shown in FIG. 2 above), i.e. the Fourier spectrum of the object space recorded in the digigram.

Figure 7:
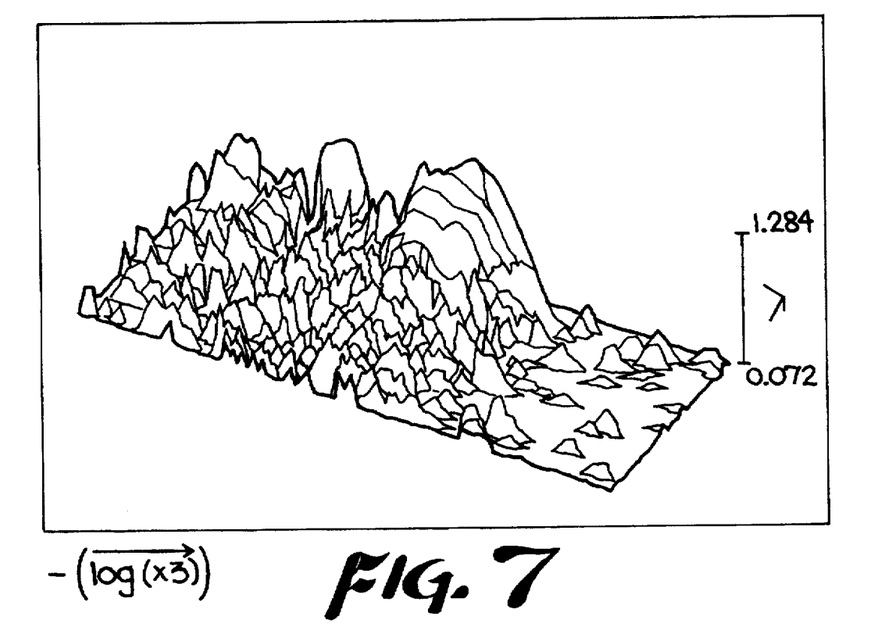
FIG. 7 shows a filtered version of the 3-D Fourier spectrum shown in FIG. 6, where the principal clutter components were removed.

FIG. 7 shows the results of modification of the FIG. 6 spectrum, wherein the principal clutter components have been eliminated, and the noise 'floor' has been raised.

Figure 8:
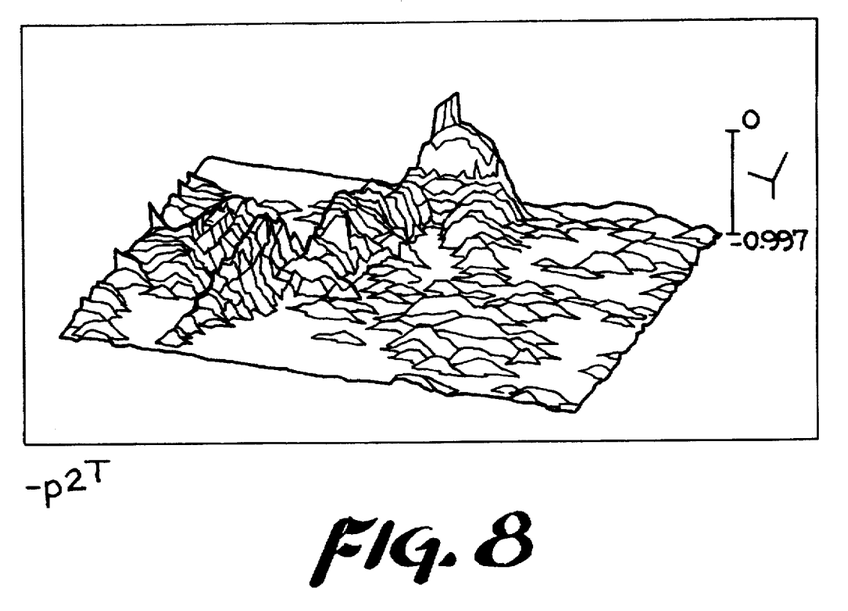
FIG. 8 shows the modified image reconstructed from the filtered spectrum.

FIG. 8 shows the final result, namely, the image reconstructed after taking the inverse-Fourier transformation of the modified Fourier spectrum of FIG. 7.

Figure 9:
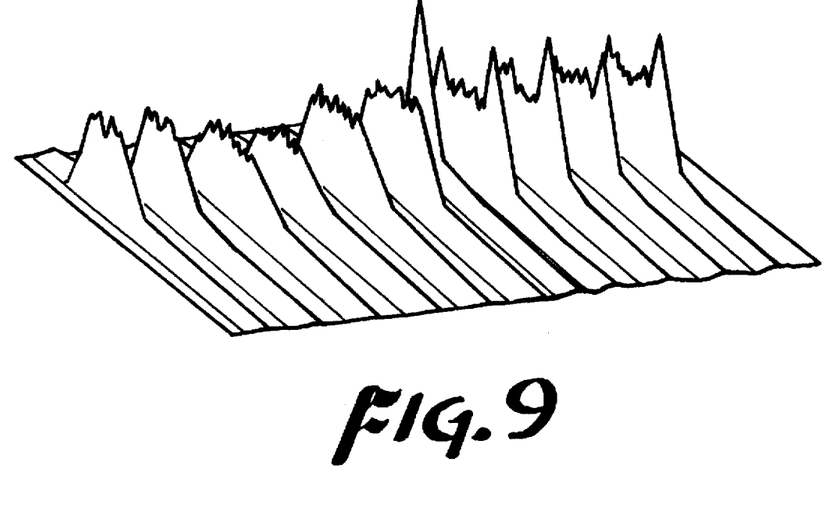
FIG. 9 shows the result of a simulation representing an optimally encoded airborne pulse doppler radar tracking an outbound target embedded in sidelobe clutter.

FIG. 9 presents the results from a simulation representing an optimally encoded airborne pulse doppler radar tracking an outbound target embedded in sidelobe clutter. Shown in the figure is the reconstructed range/doppler object space.

Figure 10:
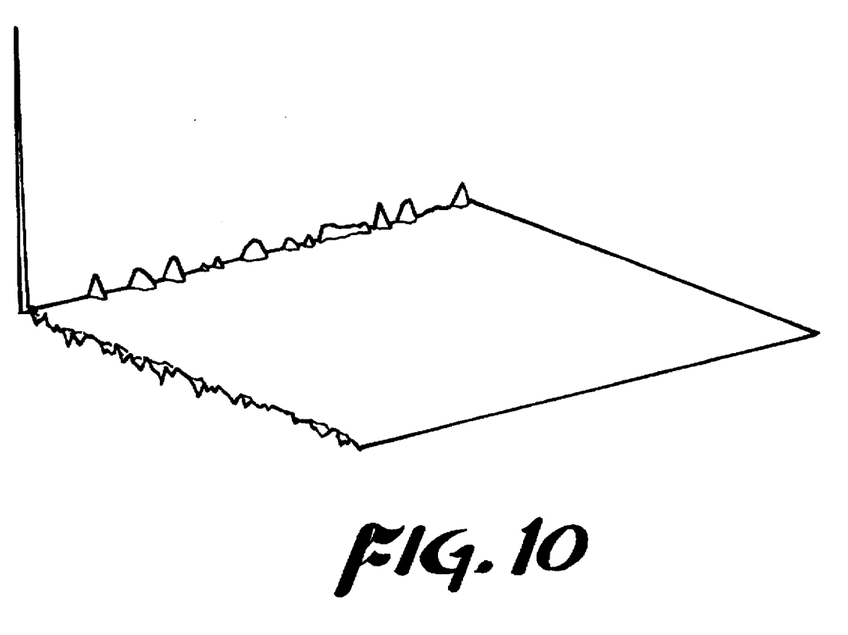
FIG. 10 shows the principal ambiguity diagram (neglecting doppler ambiguities at multiples of the PRF) when the target return signal has been correlated with a delayed replica of the transmitted optimal code. The delay used in this example equated to the round trip target range.

FIG. 10 shows the principal ambiguity diagram (neglecting doppler ambiguities at multiples of the PRF) when the target return signal has been correlated with a delayed replica of the transmitted optimal code. The delay used in this example equated to the round trip target range.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims.

I claim:

1. A holographic radar comprising:

transmitter means to generate and transmit a plurality of modulated signals;

receiver means to collect and process input scene signals returned from one or more target objects imbedded in clutter;

correlator means to correlate said returned signals with delayed replicas of each transmitted signal;

sampling means to generate and hold data point outputs of said correlator; means for resolving and arranging said sampled data points in a range v. velocity matrix;

means to perform a fast Fourier transform (FFT) on said matrix;

operational means to modify the output matrix of said FFT means;

means to perform an inverse fast Fourier transform (IFFT) on the results of such modification;

operational means to modify the output matrix of said IFFT means; and display means for viewing the outputs from said modified matrix of said IFFT in which a holographic reconstruction of the input scene is formed.

2. A holographic radar comprising:

transmitter means to generate and transmit a plurality of modulated signals;

receiver means to collect and process input scene signals returned from one or more target objects imbedded in clutter;

correlator means to correlate said returned signals with delayed replicas of each transmitted signal;

sampling means to generate and hold data point outputs of said correlator;

means for resolving and arranging said sampled data points in a range v. target angle matrix;

means to perform a fast Fourier transform (IFFT) on said matrix;

operational means to modify the output matrix of said FFT means;

means to perform an inverse fast Fourier transform (IFFT) on the results of such modification;

operational means to modify the output matrix of said IFFT means; and display means for viewing the outputs from said modified output matrix of said IFFT in which a holographic reconstruction of the input scene is formed.

3. A holographic radar as in claim 2 wherein said modulated signals are randomly coded, said coding being designed to provide an optimal ambiguity function with unambiguous range and doppler resolution over some desired extent in both range and doppler.

4. A holographic radar as in claim 1 wherein said modulated signals contain pseudo random codes, said coding being designed to provide an optimal ambiguity function with unambiguous range and doppler resolution over some desired extent in both range and doppler.

5. A holographic radar as in claim 1, wherein the velocity dimension of said range v. velocity matrix is based upon doppler measurements.

6. A holographic radar as in claim 2, wherein the target angle dimension of said range v. target angle matrix is based upon elevation angle measurements.

7. A holographic radar as in claim 2, wherein the target angle dimension of said range v. target angle matrix is based upon azimuth angle measurements.

8. A holographic radar as in claim 2, wherein said FFT is performed in a column-by-column manner.

9. A holographic radar as in claim 2, wherein said FFT is performed in a row-by-row manner.

10. A holographic radar as in claim 2 wherein said operational means to modify the output matrix of said FFT and IFFT comprises means to angularly reposition said output matrix.

11. A holographic radar as in claim 10 wherein said means to angularly reposition said output matrix further comprises means for rotating, inverting, and tilting said output matrix.

12. A holographic radar as in claim 2, wherein said operational means to modify the output matrix of said FFT and IFFT comprises means to minimize clutter.

13. A holographic radar as in claim 2, wherein said display means includes three dimentional graphics.

14. A holographic radar as in claim 13, wherein said display means includes provisions for viewing graphics at any point during said processing, including the input data stream, the input data matrix, the output of the FFT(s), the modified output of the FFT(s) and the output of the IFFT.

15. A holographic radar as in claim 14, wherein said display means includes colored graphics.

16. A method of forming a visual holographic image of a three dimentional radar target in a clutter background, comprising the steps of:
generating and transmitting a plurality of modulated signals;
receiving and processing input scene signals returned from one or more target objects imbedded in clutter;
correlating said returned signals with delayed replicas of each transmitted signal;
sampling and holding data point outputs of said correlator;
resolving and arranging said sampled data points in a range v. velocity matrix;
performing a fast Fourier transform (FFT) on said matrix;
operating to modify the output matrix of said FFT means;
performing an IFFT on the results of such modification;
modifying the output matrix of said inverse fast Fourier transform (IFFT) means; and
displaying the outputs from said modified matrix of said IFFT in which a holographic reconstruction of the input scene is formed.

17. A method of forming a visual holographic image of a three dimentional radar target in a clutter background, as in claim 16, wherein modifying the output matrix of said IFFT and said FFT comprises angularly repositioning of said output matrix.

18. A method of forming a visual holographic image of a three dimentional radar target in a clutter background, as in claim 16, wherein modifying the output matrix of said IFFT and said FFT further comprises rotating, inverting, and tilting said output matrix.

19. A method of forming a visual holographic image of a three dimentional radar target in a clutter background, as in claim 16, wherein modifying the output matrix of said IFFT and said FFT further comprises mimimizing clutter.

* * * * *